US008645904B2

(12) United States Patent
Coldicott et al.

(10) Patent No.: US 8,645,904 B2
(45) Date of Patent: Feb. 4, 2014

(54) CROSS REPOSITORY IMPACT ANALYSIS USING TOPIC MAPS

(75) Inventors: Peter Alan Coldicott, Austin, TX (US);
Eoin Lane, Littleton, MA (US); Magda Mahmoud Mourad, Yorktown Heights, NY (US); Franciscus Jacobus van Ham, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 12/605,660

(22) Filed: Oct. 26, 2009

(65) Prior Publication Data

US 2011/0099050 A1 Apr. 28, 2011

(51) Int. Cl.
*G06F 9/44* (2006.01)
(52) U.S. Cl.
USPC ......... 717/100; 717/104; 705/7.37; 705/7.22; 705/7.26; 705/80; 718/100
(58) Field of Classification Search
None
See application file for complete search history.

(56) References Cited

U.S. PATENT DOCUMENTS

| | | | |
|---|---|---|---|
| 6,256,773 B1 | 7/2001 | Bowman-Amuah |
| 6,539,396 B1 | 3/2003 | Bowman-Amuah |
| 6,658,644 B1 | 12/2003 | Bishop et al. |
| 6,799,174 B2 | 9/2004 | Chipman et al. |
| 7,080,064 B2 | 7/2006 | Sundaresan |
| 7,099,859 B2 | 8/2006 | Sundaresan |
| 7,103,871 B1 | 9/2006 | Kirkpatrick et al. |
| 7,225,241 B2 | 5/2007 | Yada |
| 7,318,055 B2 | 1/2008 | Britton et al. |
| 7,366,706 B2 | 4/2008 | Chang et al. |
| 7,412,457 B2 | 8/2008 | Saracco et al. |
| 7,483,973 B2 | 1/2009 | An et al. |
| 7,526,501 B2 | 4/2009 | Albahari et al. |
| 7,546,295 B2 | 6/2009 | Brave et al. |
| 7,890,517 B2 | 2/2011 | Angelo et al. |
| 7,979,840 B2 | 7/2011 | Zhang et al. |

(Continued)

FOREIGN PATENT DOCUMENTS

WO 2007113164 10/2007

OTHER PUBLICATIONS

Volzer, Hagen, et al. "A tool for subsystem configuration management." Software Maintenance, 2002. Proceedings. International Conference on. IEEE, 2002.*

(Continued)

*Primary Examiner* — Gurkanwaljit Singh
(74) *Attorney, Agent, or Firm* — Patents on Demand P.A.; Brian K. Buchheit; Scott M. Garrett

(57) ABSTRACT

An apparatus for automatically analyzing the impact of changing a business requirement on an IT infrastructure of an enterprise. A request is received to perform an analysis of an impact on the enterprise by changing a particular instance of the business requirement. A model repository is queried to determine which IT assets of the enterprise are impacted by changing the particular instance of the business requirement. An impact relevant subset of a topic map is received from the model repository representing the impact on the enterprise by changing the particular instance of the business requirement that includes the particular instance requirement as a root node and only those specific assets impacted by changing the particular instance requirement as connected nodes. Then, the impact relevant subset of the topic map representing the impact on the enterprise by changing the particular instance of the business requirement is outputted on an output device.

20 Claims, 8 Drawing Sheets

(56) References Cited

U.S. PATENT DOCUMENTS

| | | | |
|---|---|---|---|
| 2002/0069102 A1* | 6/2002 | Vellante et al. | 705/10 |
| 2002/0073106 A1 | 6/2002 | Parker et al. | |
| 2002/0194053 A1* | 12/2002 | Barrett et al. | 705/10 |
| 2003/0009740 A1 | 1/2003 | Lan | |
| 2003/0233631 A1 | 12/2003 | Curry et al. | |
| 2004/0172612 A1 | 9/2004 | Kasravi et al. | |
| 2004/0193476 A1* | 9/2004 | Aerdts | 705/10 |
| 2005/0050311 A1 | 3/2005 | Joseph et al. | |
| 2005/0050549 A1 | 3/2005 | Joseph et al. | |
| 2005/0138113 A1 | 6/2005 | Brendle et al. | |
| 2005/0166178 A1 | 7/2005 | Masticola et al. | |
| 2005/0278202 A1* | 12/2005 | Broomhall et al. | 705/7 |
| 2006/0015489 A1 | 1/2006 | Probst et al. | |
| 2006/0047810 A1 | 3/2006 | Herzog et al. | |
| 2006/0070083 A1 | 3/2006 | Brunswig et al. | |
| 2006/0174222 A1 | 8/2006 | Thonse et al. | |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2007/0073663 A1 | 3/2007 | McVeigh et al. | |
| 2007/0112712 A1 | 5/2007 | Flinn et al. | |
| 2007/0239768 A1 | 10/2007 | Quinn-Jacobs | |
| 2007/0261027 A1 | 11/2007 | Dhanakshirur et al. | |
| 2007/0271277 A1 | 11/2007 | Ivan et al. | |
| 2008/0059630 A1* | 3/2008 | Sattler et al. | 709/224 |
| 2008/0114700 A1* | 5/2008 | Moore et al. | 705/36 R |
| 2008/0126397 A1 | 5/2008 | Alexander et al. | |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetain et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0270372 A1 | 10/2008 | Hsu et al. | |
| 2008/0288944 A1 | 11/2008 | Coqueret et al. | |
| 2009/0064087 A1 | 3/2009 | Isom | |
| 2009/0077043 A1 | 3/2009 | Chang et al. | |
| 2009/0089078 A1 | 4/2009 | Bursey | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 | 5/2009 | Lane et al. | |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |
| 2009/0204467 A1 | 8/2009 | Rubio et al. | |
| 2009/0210390 A1 | 8/2009 | Lane | |
| 2010/0082387 A1* | 4/2010 | Cao et al. | 705/7 |
| 2010/0106656 A1* | 4/2010 | Sheth et al. | 705/301 |
| 2010/0161629 A1 | 6/2010 | Palanisamy et al. | |
| 2011/0035391 A1 | 2/2011 | Werner et al. | |
| 2011/0153292 A1 | 6/2011 | Lane et al. | |
| 2011/0153293 A1 | 6/2011 | Coldicott et al. | |
| 2011/0153608 A1 | 6/2011 | Lane et al. | |
| 2011/0153610 A1 | 6/2011 | Carrato et al. | |
| 2011/0153767 A1 | 6/2011 | Coldicott et al. | |
| 2011/0238610 A1 | 9/2011 | Lee et al. | |

OTHER PUBLICATIONS

Sadiq, Shazia, and Maria Orlowska. "Architectural considerations in systems supporting dynamic workflow modification." Proceedings of the workshop on Software Architectures for Business Process Management at CAiSE. vol. 99. 1999.*

Sadiq, Wasim, and Maria E. Orlowska. "Analyzing process models using graph reduction techniques." Information systems 25.2: 117-134 (2000).*

Sadiq, Wasim, and Maria E. Orlowska. "Applying graph reduction techniques for identifying structural conflicts in process models." Advanced Information Systems Engineering. Springer Berlin Heidelberg, 1999.*

Preparing the Organizational 'Soil' for Measurable and Sustainable change: Business Value Management and Project Governance Journal of Change Management, vol. 4, No. 1, 45-62, Mar. 2004.*

Prosci's Change Management Maturity Model Prosci © 2004.*

The Development of a Best Practice Model for Change Management European Management Journal vol. 15, No. S, pp. 537-545, 1997.*

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

U.S. Appl. No. 12/605,635, filed Oct. 26, 2009, Coldicott et al.

U.S. Appl. No. 12/605,562, filed Oct. 26, 2009, Coldicott et al.

Chen, D-W. et al.; "A P2P based Web service discovery mechanism with bounding deployment and publication", Chinese Journal of Computers; vol. 28; No. 4; pp. 615-626; Apr. 2005.

Lee, J. et al.; "Semantic and Dynamic Web Service of SOA based Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2".

Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F".

Building SOA applications with reusable assets, Part 3: WS response template pattern, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2 F".

"System and Method for Distributed Web Service Adaptation using Aspect oriented Programming", IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

(56) References Cited

OTHER PUBLICATIONS

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

* cited by examiner

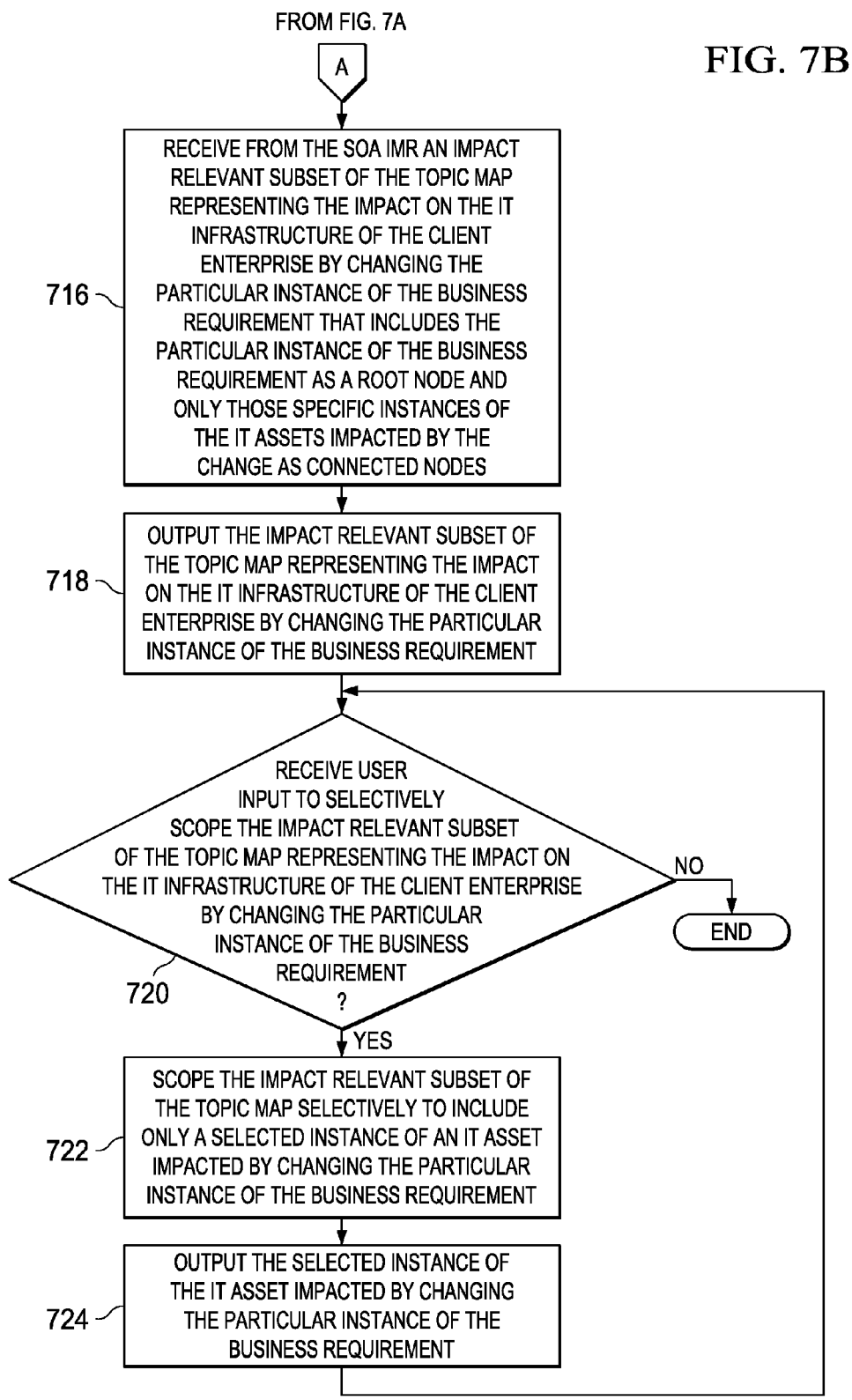

US 8,645,904 B2

CROSS REPOSITORY IMPACT ANALYSIS USING TOPIC MAPS

BACKGROUND

1. Field

The disclosure relates generally to an improved data processing system and more specifically to a computer implemented method, apparatus, and computer usable program code for automatically analyzing and assessing the impact of changing an information technology business requirement on an information technology infrastructure of an enterprise and particularly on business information technology services used to provision the business requirement.

2. Description of the Related Art

The use of service-oriented architecture (SOA) environments and information services is fast becoming the preferred implementation for enterprise systems. Using SOA, an enterprise may be visualized as a collection of loosely coupled building blocks, called information services or business services. Information services provide a discrete business function, such as, for example, checking credit, opening an account, and so on, that can be adapted to a particular business context. As a business expands its enterprise capabilities, more information services are added to the network to accommodate the expansion.

SOA is about enabling or aligning businesses with information technology (IT) through a flexible services-based approach. This aligning of businesses with IT implies that business services can be reconfigured to meet changes in business processes. SOA is also about making businesses more flexible and agile in changing market conditions. For example, a business may decide to focus more on a middle market rather than on a personal line of business.

As a business changes its focus, the business will want to quickly understand the IT impact of these changes on the business, such as which business services will be affected by the change. Today, no good way exits for automating this visibility within an SOA-based enterprise architecture. An SOA-based enterprise architecture is a holistic expression of an enterprise's key business information, application, and technology strategies, along with their impact on models for business functions, rules, and processes.

SUMMARY

According to one embodiment of the present invention, the impact of changing a business requirement on an information technology infrastructure of an enterprise is automatically analyzed. A request is received to perform an analysis of an impact on the information technology infrastructure of the enterprise by changing a particular instance of the business requirement. A model repository is queried to determine which information technology assets of the enterprise are impacted by changing the particular instance of the business requirement. An impact relevant subset of a topic map is received from the model repository representing the impact on the information technology infrastructure of the enterprise by changing the particular instance of the business requirement that includes the particular instance of the business requirement as a root node and only those specific information technology assets impacted by changing the particular instance of the business requirement as connected nodes. Then, the impact relevant subset of the topic map representing the impact on the information technology infrastructure of the enterprise by changing the particular instance of the business requirement is outputted on an output device.

DETAILED DESCRIPTION

Figure 1:
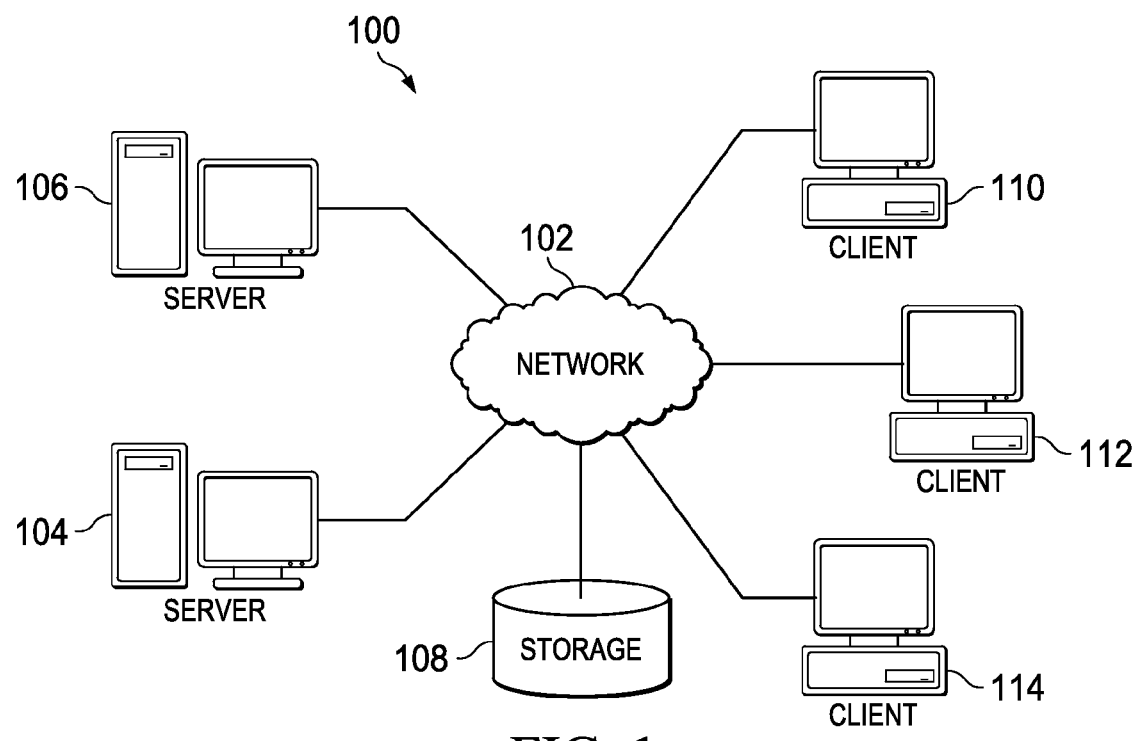
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any medium that can store the program for use by or in connection with the instruction execution system, apparatus, or device. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
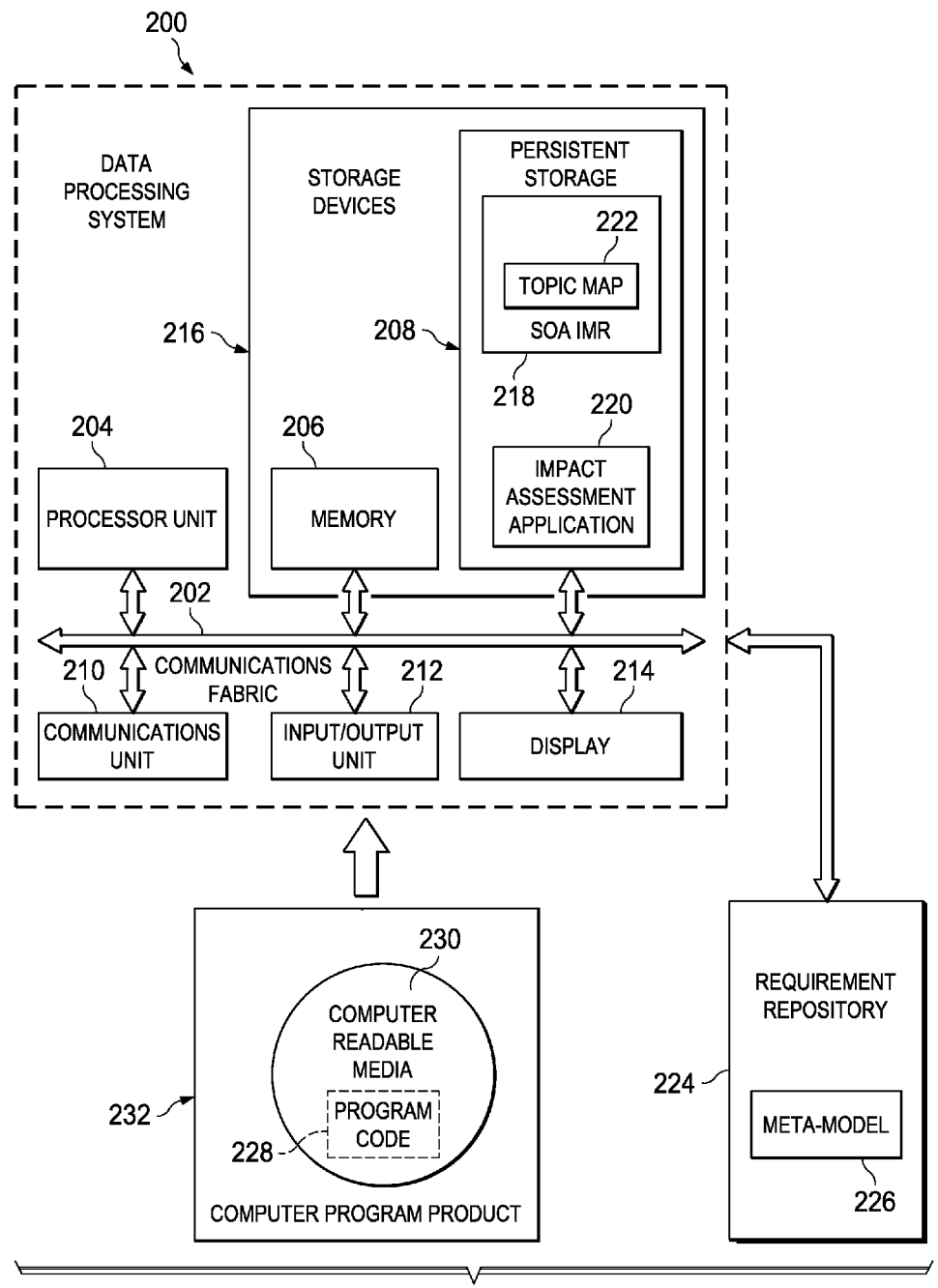
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. Storage unit 108 is a network storage device capable of storing data in a structured or unstructured format. Further, storage unit 108 may represent a plurality of storage units connected to network 102. Storage 108 may, for example, be a database within an enterprise that stores and manages reusable software IT assets and any other data related to these reusable software IT assets.

In addition, storage 108 may be a standards-based business service repository that captures information regarding business services, business policies, and service subscribers or clients.

Clients 110, 112, and 114 also connect to network 102. Clients 110, 112, and 114 may, for example, be personal computers or network computers. Users, such as solution architects, may utilize client devices 110, 112, and 114 to automatically analyze and assess the impact of changes made to the reusable software IT assets stored in storage 108. In the depicted example, server 104 provides information, such as boot files, operating system images, and applications to clients 110, 112, and 114. Clients 110, 112, and 114 are clients to server 104 and/or server 106 in this example. Network data processing system 100 may include additional servers, clients, and other devices not shown to implement processes of illustrative embodiments.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may, for example, be a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Persistent storage 208 includes SOA industry model repository (IMR) 218 and impact assessment application 220. SOA IMR 218 provides the needed tools to tie business goals with models for business processes and services in order to support IT systems that express the SOA enterprise architecture. SOA IMR 218 provides the ability to automatically select software processes and service models based on the functional requirements for a desired software application design. For example, based on an input requirement for a reservation service for a car rental company, SOA IMR 218 automatically selects relevant software models, such as a use case model for a reservation, a business process model, a service model, a domain model, and a data model, all related to creating the reservation system. Consequently, SOA IMR 218 must manage and maintain complex associations between functional requirements and the reusable software models.

It should be noted that SOA IMR 218 may be implemented as a relational database. Moreover, SOA IMR 218 includes topic maps 222. SOA IMR 218 uses topic maps 222 to maintain the complex associations between functional requirements and the reusable software models needed to satisfy those functional requirements. Topic maps are an ISO standard for the representation and interchange of knowledge, with an emphasis on the findability of information. The ISO standard is formally known as ISO/IEC 13250:2003. Topic maps are a way to build standard indexes.

A topic map represents information using topics that may represent any concept from people, countries, and organizations to software modules, individual files, and events. In this case, a topic may be a functional requirement, a non-functional requirement, a software model, or a software pattern. In other words, illustrative embodiments may use a topic map to model relationships between software requirements, which include functional and non-functional requirements, and necessary reusable software assets, which include software models and patterns, needed to satisfy those software requirements.

Associations between the topics within the topic map represent how topics relate to one another. In addition, the topic map maintains occurrences of the topics that represent where the topics may be found, such as a Webpage, a uniform resource locator (URL), or a reference within a book. Thus, topic maps are similar to semantic networks, concept maps, and mind maps. However, it should be noted that illustrative embodiments are not limited to the use of topic maps to represent stored data. Illustrative embodiments may, for example, use the Web Ontology Language (OWL). OWL is a family of knowledge representation languages for authoring ontologies and is endorsed by the World Wide Web Consortium (W3C).

Impact assessment application 220 is a software program that provides tools to analyze and assess the impact of a software change to a business service or process across an entire enterprise. For example, impact assessment application 220 is able to determine who is impacted as a result of a change in a requirement for a business service or process; when does the requirement change need to be implemented in the system in order to achieve the desired business goal or objective; where possible problems may present themselves when implementing this new technology or process; and how does this requirement change to the system impact the enterprise's business goals or objectives.

Also, data processing system 200 is coupled to requirement repository 224 via a network, such as network 102 in FIG. 1. Requirement repository 224 includes meta-model 226. A meta-model is an explicit model of the constructs and rules needed to build specific models within a domain of interest. A valid meta-model is an ontology, but not all ontologies are modeled explicitly as meta-models.

Requirement repository 224 captures and stores published standards-based service components and composite business services, which customers and business partners may discover and use in their own business processes. Businesses may build on each other's services, creating new loosely coupled, process-centric and industry-centric business service ecosystems.

Requirement repository 224 may, for example, be a commercially available system, such as Rational® RequisitePro®, a product available from International Business Machines Corporation. Rational® RequisitePro® is a requirements management tool that organizes and documents business requirements so that an enterprise can manage software application design change and provides for collaborative development of software applications. A business requirement is a capability that a software application design must provide. Conformance to some set of requirements defines the success of a software application.

In addition, requirement repository 224 may represent a plurality of business requirement repositories managed by a plurality of different client enterprises. Requirement repository 224 may include data regarding industry type, architectural style, functional business requirements, and non-functional business requirements. Industry type defines the type of industry, such as, for example, the insurance, financial, healthcare, or retail industry, associated with a particular software application. Architectural style defines the architectural style, such as SOA, client/server, or distributed computing architectural style, for the particular software application.

Software application frameworks offer sets of reusable and adaptable components embedded within an architecture optimized for a given target domain. A software IT asset is a collection of artifacts that provide a solution to a problem in a particular context, such as a business requirement, a design model, implementation code, or a test case. A software IT asset generally refers to a set of one or more related artifacts that have been created or harvested for the purpose of applying the IT asset repeatedly in subsequent software development environments. Source code and binary code are examples of artifacts adapted for use with the software IT assets. Other examples of artifacts include related documentation, such as business requirement specifications, design documents, operation manuals, and the like. Additional examples of artifacts include models, such as process models, structural models, resource models, implementation models, and so forth, which may additionally include object models, collaboration diagrams, deployment models, etc.

Reusable software IT assets may be utilized to address both the functional and nonfunctional business requirements of a software application. Functional business requirements define what a particular piece of software can be expected to accomplish within a particular context. Non-functional business requirements define global constraints that must be satisfied by the software application. These global constraints, also known as software global attributes, typically include performance, fault-tolerance, availability, scalability, transactionality, and security constraints. In other words, non-functional business requirements define how the software application is built within a particular context.

During a software development process, functional business requirements are incorporated into software artifacts and are implemented in such a manner that the software satisfies the functional business requirements for the software application. However, non-functional business requirements are not implemented in the same manner as functional business requirements. Non-functional business requirements are more complex to deal with and are usually very abstract. In addition, non-functional business requirements may conflict with each other.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and executed by a processor in processor unit 204. The program code in the different embodiments may be embodied on different physical or tangible computer readable media, such as memory 206 or persistent storage 208.

Program code 228 is located in a functional form on computer readable media 230 that is selectively removable and may be loaded onto or transferred to data processing system 200 for execution by processor unit 204. Program code 228 and computer readable media 230 form computer program product 232 in these examples. In one example, computer readable media 230 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 230 also may take the form of a persistent storage, such as a hard drive, a thumb drive, or a flash memory that is connected to data processing system 200. The tangible form of computer readable media 230 is also referred to as computer recordable storage media. In some instances, computer readable media 230 may not be removable.

Alternatively, program code 228 may be transferred to data processing system 200 from computer readable media 230 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

In some illustrative embodiments, program code 228 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 228 may be a server computer, a client computer, or some other device capable of storing and transmitting program code 228.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 230 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may, for example, be memory 206 or a cache such as found in an interface and memory controller hub that may be present in communications fabric 202.

Illustrative embodiments provide a computer implemented method, apparatus, and computer usable program code for automatically analyzing the system wide impact on an entire IT infrastructure of an enterprise by changing an IT business requirement and in particular on the business IT services used to provision the IT business requirement that is to be changed. Illustrative embodiments provide a standards-based federated approach to meta-data management and representing this meta-data using a standards-based index, such as, for example, a topic map or OWL-Description Logics (DL). This standards-based index approach provides illustrative embodiments with an undirected graph representation of the meta-data across the federated repository (i.e., the SOA IMR).

Using this standards-based index approach, illustrative embodiments are able to answer questions that integrate all relevant data, whether the relevant data comes from flat files, extensible markup language (XML), Websites, document management systems, applications, or special-purpose systems. Thus, illustrative embodiments are able to search large volumes of data and correlate this data in complex ways. In order to derive the greatest benefit from these large volumes of data, illustrative embodiments require full query-based access to all of the most up-to-date information available, irrespective of where the data is stored or the data's format, with the flexibility to customize queries easily to meet the needs of a variety of individual users.

Illustrative embodiments may be implemented as a visual client, which may be packaged within a server repository or downloaded into a client developer platform as an eclipse plug-in for example, that is capable of graphically displaying the assets (i.e., model elements) affected by the change, such as a requirement change. This visual client is also capable of graphically displaying associations between affected assets, as well as the availability of source and instances of the affected assets.

Illustrative embodiments import new specific instances of business requirements from one or more requirement repositories into the SOA IMR. An instance of a business requirement is a specific requirement that is obtained from a particular client enterprise, such as, for example, a particular client insurance company. As illustrative embodiments create IT assets to satisfy the imported IT business requirements, illustrative embodiments also create associations between these created IT assets, the instances of the business requirements that the created IT assets satisfy, and any reference IT asset models that were used to create the IT assets. Then, illustrative embodiments store these associations in the SOA IMR.

After these connectivity associations are recorded, illustrative embodiments are then able to perform a change driven impact analysis on, for example, a high level business type of requirement, such as a business focus goal or a business capability, by querying the SOA IMR to understand what IT assets are impacted by this business requirement change. Since the SOA IMR tracks everything as a topic map, illustrative embodiments are in effect asking the SOA IMR for an impact relevant subset of the topic map with that particular business requirement associated with the change as the root topic or node. Subsequent to obtaining the impact relevant subset of the topic map representing the desired high level change, such as an enterprise's change in a focus goal, illustrative embodiments essentially have all the relevant information regarding that focus goal business requirement change.

However, this impact relevant subset can typically include a lot of information. Consequently, illustrative embodiments may apply selective scoping to that impact relevant subset of the topic map to show, for example, only a particular type of IT asset that is affected by the business requirement change. Then, this selective output is displayed to the user visually on a display device, such as a computer monitor display screen.

Thus, illustrative embodiments automate and manage the traceability of the scope of the impact of changes, such as business requirement changes, on an enterprise. The scope of the impact is traced all the way through the entire IT system or the entire business service lifecycle from service identification, to service specification, to service implementation and deployment. Key benefits of analyzing the impact of business requirement changes are: 1) to minimize the complexity of data needed for decision support; 2) to mitigate risk through providing a better understanding of the impact of the business requirement changes on an enterprise; and 3) to decrease the cycle time for decision making.

By representing the federated meta-data from multiple repositories using the ISO standard of topic maps, illustrative embodiments can perform a business requirement change impact analysis on these topic maps by defining impact analysis as measuring the effect of changing graph objects and sub-graph structures in a large pathway graph. In a federated database environment, illustrative embodiments may apply graph operations to data stored in any format, such as a relational format or a non-relational format, and to data stored in any location, such as a remote location or a local location.

One example of such a federation of data would be trying to understand the relationship between personnel inside a large company. First, illustrative embodiments would aggregate together meta-data from various repositories regarding the personnel in the company, such as their roles, their managers, their departments, the teams they belonged to, the products they are working on, what clients they are involved with, and how much revenue these clients generate. Then, using an illustrative embodiment, a top executive of the company may perform an analysis of the impact on the quarterly earnings of the company by losing a few key personnel in a plane crash.

Figure 3:
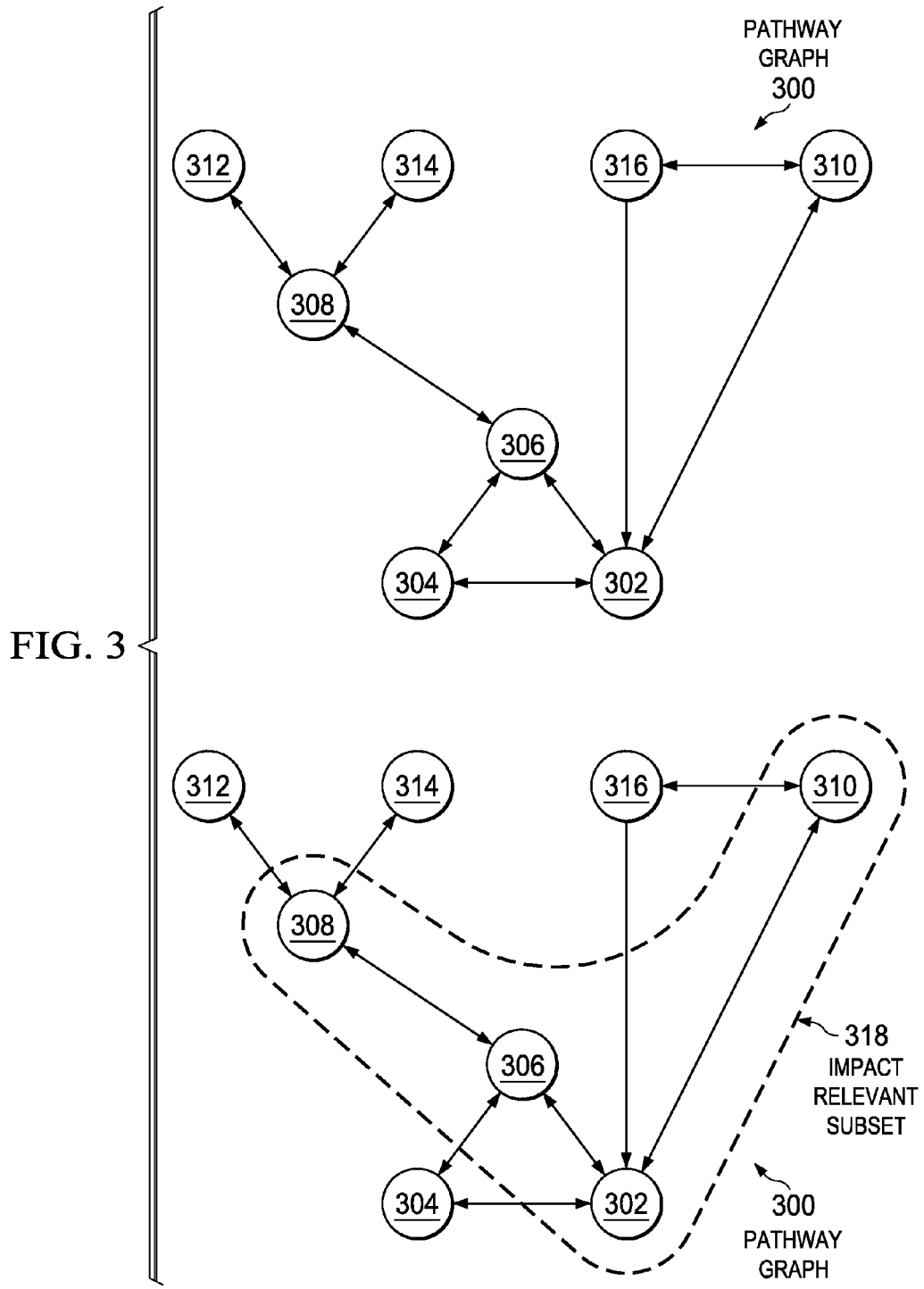
FIG. 3 is an exemplary illustration of a pathway graph in accordance with an illustrative embodiment.

With reference now to FIG. 3, an exemplary illustration of a pathway graph is depicted in accordance with an illustrative embodiment. Pathway graph 300 is a graph that illustrates the connectivity between different nodes, which may represent objects, such as IT assets, within the graph. Pathway graph 300 includes nodes 302-316.

In this particular example, an impact assessment application, such as impact assessment application 220 in FIG. 2, analyzes the impact that a change in node 308 will have on node 310. To better understand the relationship between node 308 and node 310, the impact assessment application isolates node 308, along with all of its connections with node 310, from the rest of pathway graph 300.

The impact assessment application may, for example, apply a breadth-first search algorithm to pathway graph 300 by passing in the start node (i.e., node 308) and the end node (i.e., node 310). A breadth-first search algorithm is a graph search algorithm that begins at the root node and explores all the neighboring nodes. Then, for each of those nearest nodes, the algorithm explores their unexplored neighbor nodes, and so on, until the algorithm finds the goal or end node. The impact assessment application uses this breadth-first search algorithm to find all connected nodes (i.e., all connected paths between node 308 and node 310) in pathway graph 300. This process allows the impact assessment application to isolate that part of pathway graph 300 that is of interest (i.e., impact relevant sub-graph 318). The impact assessment application may use a Java™ implementation of such an algorithm to do such a graph search within entire topic maps to retrieve the impact relevant sub-graph, which is by definition also a topic map. Java and all Java-based trademarks and logos are trademarks of Sun Microsystems, Inc. in the United States, other countries, or both.

In this example, impact relevant sub-graph 318 includes nodes 308, 306, 302, and 310. Impact relevant sub-graph 318 is a subset of pathway graph 300, which is relevant to the analysis of the impact of changing node 308 and its affect(s) on node 310. After isolating impact relevant sub-graph 318, the impact assessment application performs the appropriate analysis on the sub-graph. Subsequent to analyzing impact relevant sub-graph 318, the impact assessment application provides a visualization of this analysis to the user on a display device, such as display 214 in FIG. 2. In addition, the impact assessment application may scope or narrow this visualization to only show specific effects on node 310 as a result of changing node 308.

Figure 4:
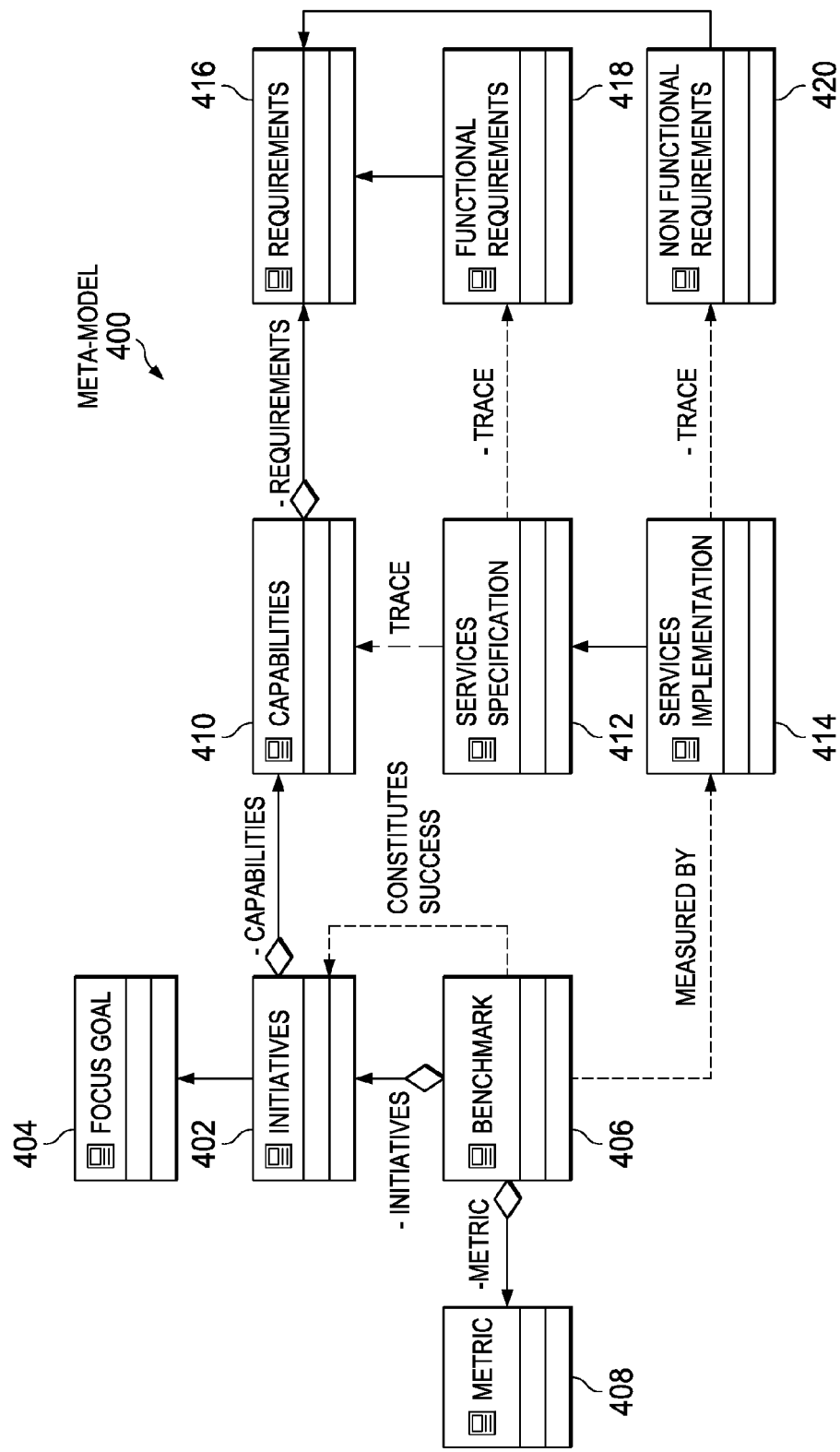
FIG. 4 is an exemplary illustration of a meta-model in accordance with an illustrative embodiment.

With reference now to FIG. 4, an exemplary illustration of a meta-model is depicted in accordance with an illustrative embodiment. Meta-model 400 may, for example, be meta-model 226 in FIG. 2. Meta-model 400 may be created by a requirement repository, such as requirement repository 224 in FIG. 2, which may be a Rational® RequisitePro® tooling.

Meta-model 400 illustrates the connections between the various types of requirements within the requirement repository from focus goal requirements all the way to specific IT instances of business requirements.

Meta-model 400 includes initiatives 402, focus goals 404, benchmarks 406, metrics 408, capabilities 410, service specifications 412, service implementations 414, requirements 416, functional requirements 418, and nonfunctional requirements 420.

Initiatives 402 represent requirements for business initiatives set by an enterprise. Focus goals 404 represent requirements for focusing on initiatives 402 as goals for the enterprise. Benchmarks 406 represent benchmarks for achieving focus goals 404. Metrics 408 represent the metrics used to measure benchmarks 406.

Capabilities 410 represent the requirements for the needed capabilities of focus goals 404. Service specifications 412 represent the specifications for capabilities 410. Service implementations 414 represent the implementations of capabilities 410.

Requirements 416 represent the specific IT instances of the business requirements of focus goals 404. Functional requirements 418 represent the functional business requirements for the specific IT instances of the business requirements. Nonfunctional requirements 420 represent the nonfunctional business requirements for the specific instances of the business requirements.

Figure 5:
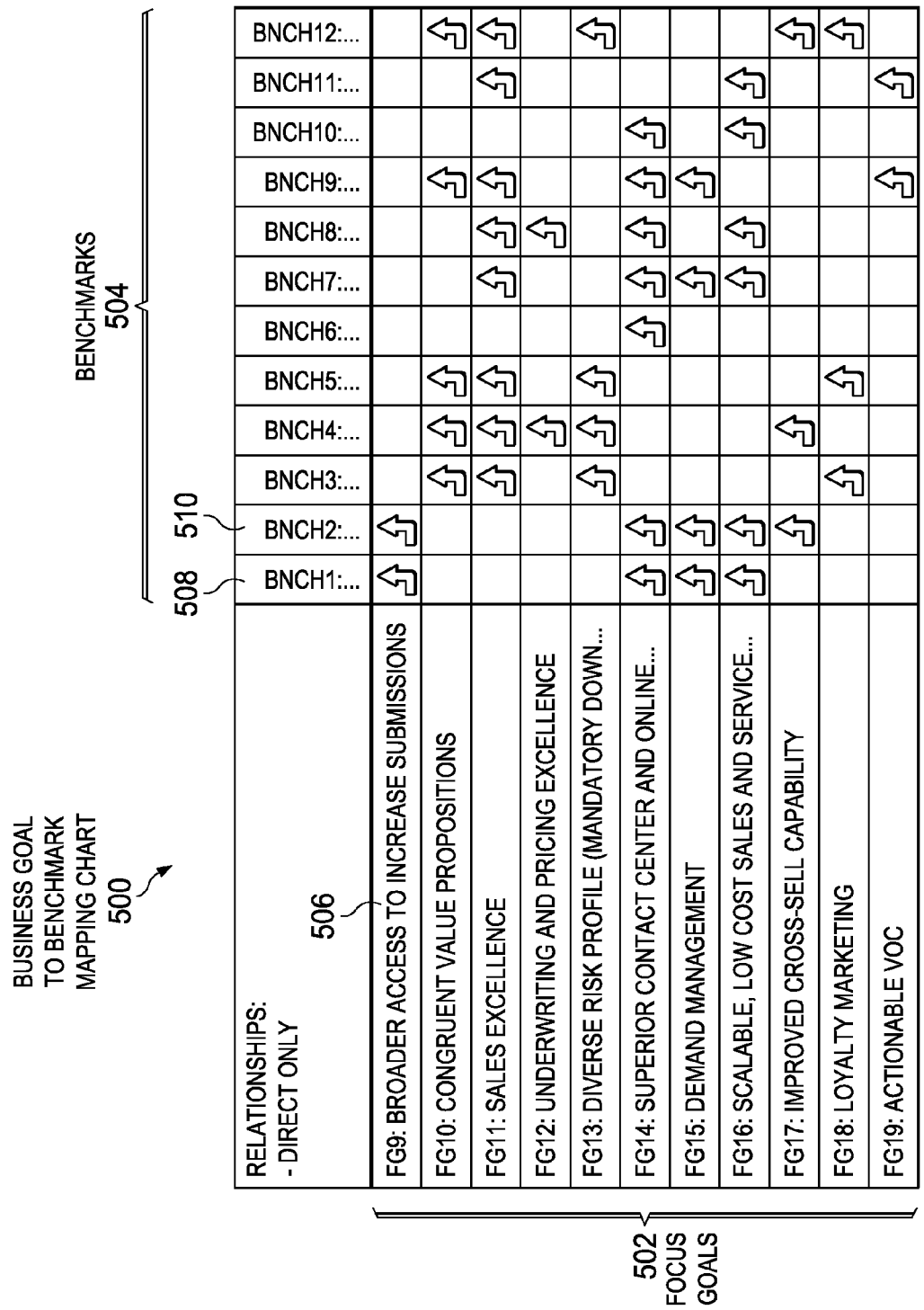
FIG. 5 is an exemplary illustration of a business goal to benchmark mapping chart in accordance with an illustrative embodiment.

With reference now to FIG. 5, an exemplary illustration of a business goal to benchmark mapping chart is depicted in accordance with an illustrative embodiment. Business goal to benchmark mapping chart 500 illustrates an example project that maps business focus goals, such as focus goals 404 in FIG. 4, to benchmarks, such as benchmarks 406 in FIG. 4. Business goal to benchmark mapping chart 500 includes focus goals 502 and benchmarks 504.

In this example project, an enterprise's focus goal of "Broader access to increase submissions" (i.e., focus goal 506) is tied to benchmark 1 508 and benchmark 2 510. Using a meta-model, such as meta-model 400 in FIG. 4, illustrative embodiments may then trace from these identified benchmarks to the respective capabilities and from the capabilities to the specific IT instances of the business requirements for the focus goal. Afterward, illustrative embodiments import these specific IT instances of the business requirements into an SOA IMR, such as SOA IMR 218 in FIG. 2, from the client enterprise.

Figure 6:
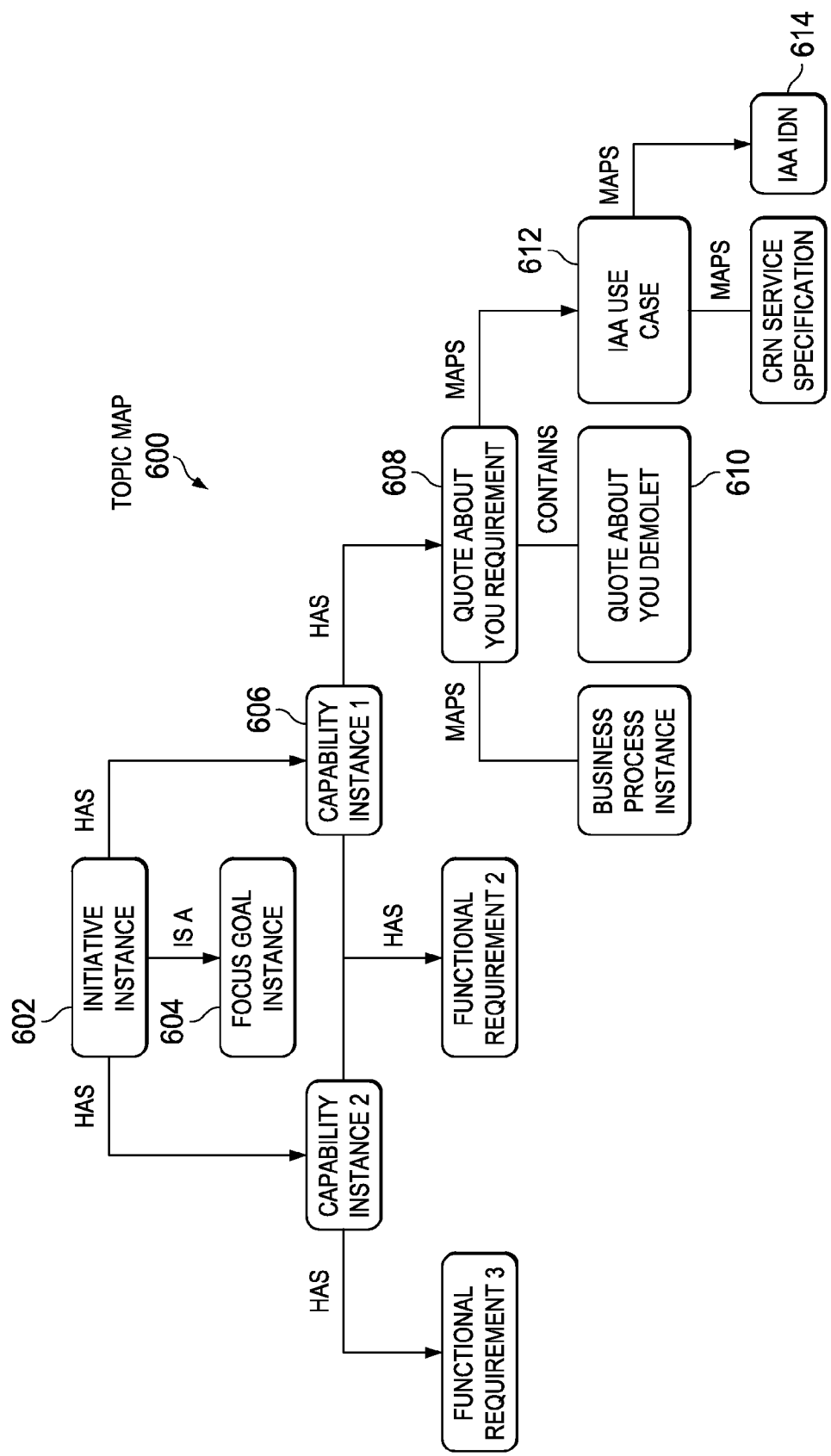
FIG. 6 is an exemplary illustration of a topic map in accordance with an illustrative embodiment; and FIG. 7A

With reference now to FIG. 6, an exemplary illustration of a topic map is depicted in accordance with an illustrative embodiment. Topic map 600 may, for example, be topic map 222 in FIG. 2. Topic map 600 illustrates the connectivity captured inside an SOA IMR, such as SOA IMR 218 in FIG. 2, between business initiatives, focus goals, benchmarks, capabilities, IT reference requirements, IT instance requirements, reference models and instance models.

Topic map 600 includes initiative instance 602, focus goal instance 604, capability instance 606, functional requirement 608, reference requirement 610, reference model 612, and instance model 614. Initiative instance 602 is focus goal instance 604. Also, initiative instance 602 has capability instance 606. Capability instance 606 has functional requirement 608. In this example, functional requirement 608 is a specific business requirement for building an insurance company business service to provide an insurance quote to a customer. This insurance quote requirement contains reference requirement 610. Reference requirement 610 serves as a framework to build functional requirement 608.

Functional requirement 608 maps to reference model 612. In this example, reference model 612 is a specific example of an insurance application architecture (IAA) use case reference model, which is a product developed by International Business Machines Corporation. IAA is a set of information, process, and integration models that represent leading practice systems development in the insurance industry. IAA is an architectural blueprint with detailed insurance business content that can be applied to initiatives on an enterprise-wide or specific project basis. Reference model 612 maps to instance model 614. Reference model 612 serves as a framework to create instance model 614. Instance model 614 is a specific instance of reference model 612, which is specifically created for a specific client enterprise.

Figure 7A:
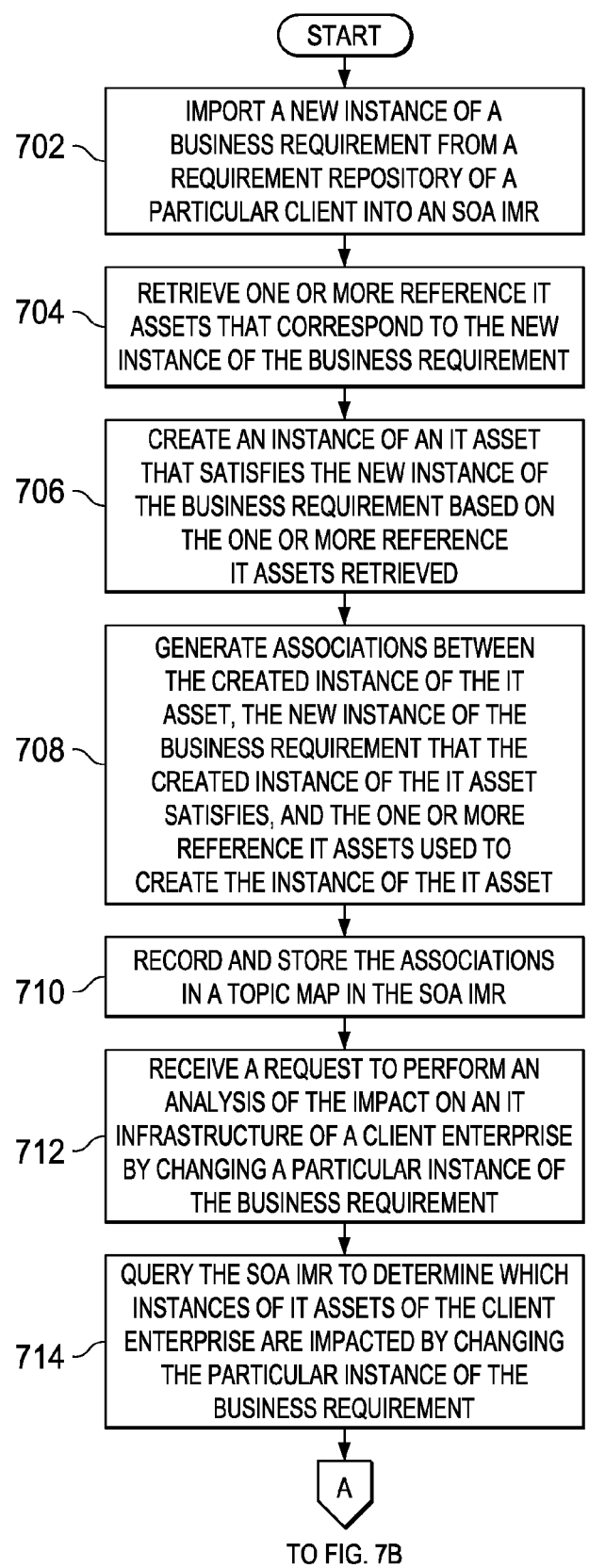
FIG. 7B is a flowchart illustrating an exemplary process for automatically analyzing the impact of changing an IT business requirement on an IT infrastructure of an enterprise in accordance with an illustrative embodiment.

With reference now to FIG. 7A and FIG. 7B, a flowchart illustrating an exemplary process for automatically analyzing the impact of changing an IT business requirement on an IT infrastructure of an enterprise is shown in accordance with an illustrative embodiment. The process shown in FIGS. 7A and 7B may be implemented in an impact assessment application, such as impact assessment application 220 in FIG. 2.

The process begins when the impact assessment application imports a new instance of a business requirement from a requirement repository, such as requirement repository 224 in FIG. 2, of a particular client enterprise into an SOA IMR, such as SOA IMR 218 in FIG. 2 (step 702). Then, the impact assessment application retrieves one or more reference IT assets that correspond to the new instance of the business requirement (step 704). Afterward, the impact assessment application creates an instance of an IT asset that satisfies the new instance of the business requirement based on the one or more reference IT assets retrieved (step 706).

Subsequently, the impact assessment application generates associations between the created instance of the IT asset, the new instance of the business requirement that the created instance of the IT asset satisfies, and the one or more reference IT assets used to create the instance of the IT asset (step 708). Then, the impact assessment application records and stores the associations in a topic map, such as topic map 222 in FIG. 2, in the SOA IMR (step 710). Afterward, the impact assessment application receives a request to perform an analysis of the impact on an IT infrastructure of a client enterprise by changing a particular instance of the business requirement (step 712). In particular, the impact assessment application receives a request to perform an analysis of the impact on business IT services used to provision the particular instance of the business requirement.

Subsequently, the impact assessment application queries the SOA IMR to determine which instances of IT assets of the client enterprise are impacted by changing the particular instance of the business requirement (step 714). Then, the impact assessment application receives from the SOA IMR an impact relevant subset of the topic map representing the impact on the IT infrastructure of the client enterprise by changing the particular instance of the business requirement that includes the particular instance of the business requirement as a root node and only those specific instances of the IT assets impacted by the change as connected nodes (step 716). Afterward, the impact assessment application outputs the impact relevant subset of the topic map representing the impact on the IT infrastructure of the client enterprise by changing the particular instance of the business requirement (step 718).

Subsequently, the impact assessment application makes a determination as to whether the impact assessment application receives a user input to selectively scope the impact relevant subset of the topic map representing the impact on the IT infrastructure of the client enterprise by changing the particular instance of the business requirement (step 720). If the impact assessment application does receive a user input to selectively scope the impact relevant subset of the topic map representing the impact on the IT infrastructure of the client enterprise by changing the particular instance of the business requirement, yes output of step 720, then the impact assessment application scopes the impact relevant subset of the topic map selectively to include only a selected instance of an IT asset impacted by changing the particular instance of the business requirement (step 722). Afterward, the impact assessment application outputs the selected instance of the IT asset impacted by changing the particular instance of the business requirement (step 724). Thereafter, the process returns to step 720. If the impact assessment application does not receive a user input to selectively scope the impact relevant subset of the topic map representing the impact on the IT infrastructure of the client enterprise by changing the particular instance of the business requirement, no output of step 720, then the process terminates thereafter.

Thus, illustrative embodiments of the present invention provide a computer implemented method, apparatus, and computer program product for automatically analyzing and assessing the impact of changing an IT business requirement on an entire enterprise IT infrastructure and in particular on the business IT services used to provision the IT business requirement to be changed. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system, comprising hardware of one or more processors and one or more memories, for automatically analyzing an impact of changing a business requirement on an information technology infrastructure of an enterprise, the computer implemented method comprising:

the data processing system receiving a request to perform an analysis of an impact on the information technology infrastructure of the enterprise by changing a particular instance of the business requirement;

the data processing system determining which information technology assets of the enterprise are impacted by changing the particular instance of the business requirement, the determining including querying a model repository and isolating a sub-graph of a pathway graph of a topic map representing the information technology infrastructure, the sub-graph including the particular instance of the business requirement as a root node and the specific information technology assets impacted by changing the particular instance of the business requirement as connected nodes, and the determining being further based on associations between the particular instance of the business requirement and each of the specific information technology assets of the connected nodes in the sub-graph;

the data processing system receiving from the model repository, as a result of the determining, an impact relevant subset of the topic map representing the impact on the information technology infrastructure of the enterprise by changing the particular instance of the business requirement that includes the particular instance of the business requirement as the root node and only those specific information technology assets impacted by changing the particular instance of the business requirement as connected nodes; and the data processing system outputting on an output device the impacts relevant subset of the topic map representing the impact on the information technology infrastructure of the enterprise by changing the particular instance of the business requirement.

2. The computer implemented method of claim 1, further comprising:

the data processing system receiving a user input to selectively scope the impact relevant subset of the topic map representing the impact on the information technology infrastructure of the enterprise by changing the particular instance of the business requirement;

the data processing system scoping the impact relevant subset of the topic map selectively to include only a selected information technology asset impacted by changing the particular instance of the business requirement based on the user input; and the data processing system outputting on the output device the selected information technology asset impacted by changing the particular instance of the business requirement.

3. The computer implemented method of claim 1, further comprising:

the data processing system importing into the model repository a new instance of the business requirement from a requirement repository of a client enterprise;

the data processing system retrieving one or more reference information technology assets that correspond to the new instance of the business requirement imported into the model repository; and the data processing system creating an instance of an information technology asset that satisfies the new instance of the business requirement based on the one or more reference information technology assets retrieved.

4. The computer implemented method of claim 3, further comprising:

the data processing system generating associations between the created instance of the information technology asset, the new instance of the business requirement that the created instance of the information technology asset satisfies, and the one or more reference information technology assets used to create the created instance of the information technology asset; and the data processing system storing the associations in the topic map in the model repository.

5. The computer implemented method of claim 3, wherein the requirement repository includes a meta-model, and wherein the meta-model includes constructs and rules needed to build specific models within a domain of interest.

6. The computer implemented method of claim 1, wherein the particular instance of the business requirement is a capability that a business information technology service must provide.

7. The computer implemented method of claim 1, wherein the model repository includes the topic map, and wherein the topic map captures connectivity between business initiatives, focus goals, benchmarks, capabilities, reference requirements, instance requirements, reference models, and instance models.

8. An apparatus for automatically analyzing an impact of changing a business requirement on an information technology infrastructure of an enterprise, comprising:

a bus system;

a storage device connected to the bus system, wherein the storage device includes a set of instructions; and a processing unit connected to the bus system, wherein the processing unit executes the set of instructions to receive a request to perform an analysis of an impact on the information technology infrastructure of the enterprise by changing a particular instance of the business requirement; determine which information technology assets of the enterprise are impacted by changing the particular instance of the business requirement by querying a model repository and isolating a sub-graph of a pathway graph of a topic map that represents the information technology infrastructure, the sub-graph including the particular instance of the business requirement as a root node and the specific information technology assets impacted by changing the particular instance of the business requirement as connected nodes, and further based on associations between the particular instance of the business requirement and each of the specific information technology assets of the connected nodes; receive from the model repository an impact relevant subset of the topic map representing the impact on the information technology infrastructure of the enterprise by changing the particular instance of the business requirement that includes the particular instance of the business requirement as the root node and only those specific information technology assets impacted by changing the particular instance of the business requirement as connected nodes; and output on an output device the impact relevant subset of the topic map representing the impact on the information technology infrastructure of the enterprise by changing the particular instance of the business requirement.

9. The apparatus of claim 8, wherein the processing unit executes a further set of instructions, stored on the storage device, to receive a user input to selectively scope the impact relevant subset of the topic map representing the impact on the information technology infrastructure of the enterprise by changing the particular instance of the business requirement; scope the impact relevant subset of the topic map selectively to include only a selected information technology asset impacted by changing the particular instance of the business requirement based on the user input; and output on the output device the selected information technology asset impacted by changing the particular instance of the business requirement.

10. The apparatus of claim 8, wherein the processing unit executes a further set of instructions, stored on the storage device, to import into the model repository a new instance of the business requirement from a requirement repository of a client enterprise; retrieve one or more reference information technology assets that correspond to the new instance of the business requirement imported into the model repository; and create an instance of an information technology asset that satisfies the new instance of the business requirement based on the one or more reference information technology assets retrieved.

11. The apparatus of claim 10, wherein the processing unit executes a still further set of instructions, stored on the storage device, to generate associations between the created instance of the information technology asset, the new instance of the business requirement that the created instance of the information technology asset satisfies, and the one or more reference information technology assets used to create the created instance of the information technology asset; and store the associations in the topic map in the model repository.

12. The apparatus of claim 10, wherein the requirement repository includes a meta-model, and wherein the meta-model includes constructs and rules needed to build specific models within a domain of interest.

13. The apparatus of claim 8, wherein the particular instance of the business requirement is a capability that a business information technology service must provide.

14. A computer program product stored on a computer usable storage medium having computer usable program code stored thereon for automatically analyzing an impact of changing a business requirement on an information technology infrastructure of an enterprise, the computer usable program code comprising:
 computer usable program code configured to receive a request to perform an analysis of an impact on the information technology infrastructure of the enterprise by changing a particular instance of the business requirement;
 computer usable program code configured to query a model repository to determine which information technology assets of the enterprise are impacted by changing the particular instance of the business requirement by a sub-graph of a pathway graph of a topic map representing the information technology infrastructure being isolated, the sub-graph including the particular instance of the business requirement as a root node and the specific information technology assets impacted by changing the particular instance of the business requirement as connected nodes, and further based on associations between the particular instance of the business requirement and each of the specific information technology assets of the connected nodes;
 computer usable program code configured to receive from the model repository an impact relevant subset of the topic map representing the impact on the information technology infrastructure of the enterprise by changing the particular instance of the business requirement that includes the particular instance of the business requirement as the root node and only those specific information technology assets impacted by changing the particular instance of the business requirement as connected nodes; and
 computer usable program code configured to output on an output device the impact relevant subset of the topic map representing the impact on the information technology infrastructure of the enterprise by changing the particular instance of the business requirement.

15. The computer program product of claim 14, wherein the computer usable program code stored on the computer usable storage medium further comprises:
 computer usable program code configured to receive a user input to selectively scope the impact relevant subset of the topic map representing the impact on the information technology infrastructure of the enterprise by changing the particular instance of the business requirement;
 computer usable program code configured to scope the impact relevant subset of the topic map selectively to include only a selected information technology asset impacted by changing the particular instance of the business requirement based on the user input; and
 computer usable program code configured to output on the output device the selected information technology asset impacted by changing the particular instance of the business requirement.

16. The computer program product of claim 14, wherein the computer usable program code stored on the computer usable storage medium further comprises:
 computer usable program code configured to import into the model repository a new instance of the business requirement from a requirement repository of a client enterprise;
 computer usable program code configured to retrieve one or more reference information technology assets that correspond to the new instance of the business requirement imported into the model repository; and
 computer usable program code configured to create an instance of an information technology asset that satisfies the new instance of the business requirement based on the one or more reference information technology assets retrieved.

17. The computer program product of claim 16, wherein the computer usable program code stored on the computer usable storage medium further comprises:
 computer usable program code configured to generate associations between the created instance of the information technology asset, the new instance of the business requirement that the created instance of the information technology asset satisfies, and the one or more reference information technology assets used to create the created instance of the information technology asset; and
 computer usable program code configured to store the associations in the topic map in the model repository.

18. The computer program product of claim 16, wherein the requirement repository includes a meta-model, and wherein the meta-model includes constructs and rules needed to build specific models within a domain of interest.

19. The computer program product of claim 14, wherein the particular instance of the business requirement is a capability that a business information technology service must provide.

20. The computer program product of claim 14, wherein the model repository includes the topic map, and wherein the topic map captures connectivity between business initiatives, focus goals, benchmarks, capabilities, reference requirements, instance requirements, reference models, and instance models.

* * * * *